United States Patent [19]

Fackler

[11] 4,203,545
[45] May 20, 1980

[54] THERMOSTATICALLY RESPONSIVE VALVE MECHANISM

[75] Inventor: Kenneth C. Fackler, Gibson City, Ill.

[73] Assignee: M & W Gear Company, Gibson City, Ill.

[21] Appl. No.: 931,487

[22] Filed: Aug. 7, 1978

[51] Int. Cl.² ............................................. G05D 23/12
[52] U.S. Cl. ................................ 236/93 A; 137/599.2; 236/99 E
[58] Field of Search ................. 236/93 A, 93 R, 99 E, 236/99 K, 99 J; 137/599.2; 165/40

[56] References Cited

U.S. PATENT DOCUMENTS

| | | | |
|---|---|---|---|
| 1,548,900 | 8/1925 | Parks | 236/58 |
| 2,271,850 | 2/1942 | Zinkil | 236/93 R X |
| 2,702,052 | 2/1955 | Grayson | 137/599.2 X |
| 3,047,055 | 7/1962 | Kimm | 236/93 A X |
| 3,067,769 | 12/1962 | Skulley | 137/599.2 X |
| 3,175,582 | 3/1965 | London | 137/599.2 |
| 3,994,269 | 11/1976 | Takaoka et al. | 236/99 E X |
| 4,011,988 | 3/1977 | Inagaki | 236/34.5 |

*Primary Examiner*—Albert J. Makay
*Assistant Examiner*—William E. Tapolcai, Jr.
*Attorney, Agent, or Firm*—Allegretti, Newitt, Witcoff & McAndrews

[57] ABSTRACT

A thermostatically responsive valve bypass mechanism includes a piston slidably mounted in a bypass channel through a valve member. The piston is normally spring biased to a first closed position. A heat transmissive probe is attached to the valve member and includes a series of thermostatic actuators mounted in opposed relation to the spring biased piston. The actuators expand in response to increased temperature and force the piston to an open position whereby fluid flow occurs through the bypass channel.

5 Claims, 2 Drawing Figures

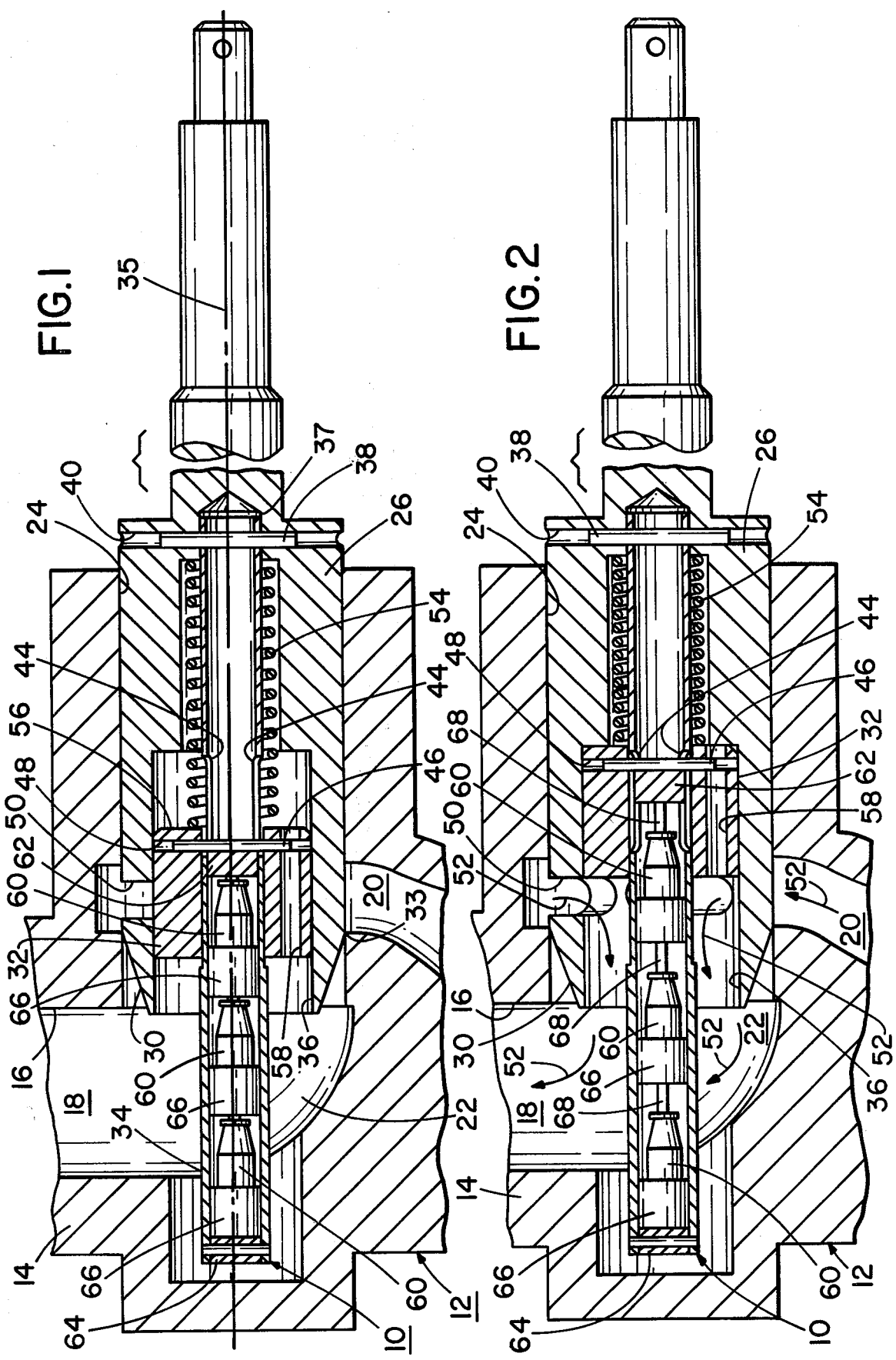

THERMOSTATICALLY RESPONSIVE VALVE MECHANISM

BACKGROUND OF THE INVENTION

This invention relates to valves, and more particularly, to a thermostatically responsive valve bypass mechanism.

An adjustable valve member cooperative with a valve seat may be utilized to control the quantity of fluid flowing through a passageway. In some such applications, the fluid may become overheated which indicates a need for increased fluid flow or bypassing the valve mechanism. Other temperature considerations may dictate a need to bypass the valve mechanism.

The present invention relates to a temperature responsive mechanism for bypassing fluid flow through a valve. The mechanism is of a simplified design and may therefore be incorporated with many types of existing valve mechanisms.

SUMMARY OF THE INVENTION

In a principal aspect, the present invention is the improvement of a thermostatically responsive valve bypass mechanism for incorporation in a valve assembly. Typically a valve assembly includes a valve seat defining a valve opening and a valve member cooperative with the valve seat to close and open the valve opening. The thermostatically responsive valve bypass mechanism permits fluid to flow through the valve assembly at an increased rate in response to sensing of a preselected temperature of fluid flowing through the valve assembly.

The thermostatically responsive valve bypass mechanism includes a bypass channel defined within the valve member. A piston is slidably mounted within the bypass channel for movement between a first closed position and a second, open position. Biasing means normally biases the piston to the closed position.

A heat transmission probe attached to the valve member, projects into the path of fluid. The probe provides a mounting platform for thermostatically responsive, expansible means. The expansible means is operably connected to the piston means. When a pre-selected temperature is reached, the expansible means forces the piston against the biasing force to the open position. Fluid thus flows through the bypass channel.

It is thus an object of the present invention to provide an improvement in a valve assembly of a thermostatically responsive valve bypass mechanism.

Another object of the present invention is to provide a thermostatically responsive valve bypass mechanism that operates independently of the valve member of the valve assembly.

Another object of the present invention is to provide a thermostatically responsive valve bypass mechanism which operates automatically upon the existence of a pre-selected temperature of fluid flowing through the valve assembly.

Another object of the present invention is to provide a non-electrical, thermostatically responsive valve bypass mechanism which requires no external source of power.

Still another object of the present invention is to provide an improved thermostatically responsive valve bypass mechanism which is easily manufactured, reliable, accurate, inexpensive and compatible with various types of existing valve mechanisms.

These and other objects of the present invention will become apparent from the detailed description of the preferred embodiment of the present invention, which follows.

BRIEF DESCRIPTION OF THE DRAWING

The drawing which accompanies this specification includes two views of the preferred embodiment of the present invention labeled FIG. 1 and FIG. 2, which, briefly described, are as follows:

FIG. 1 is a cross-sectional view of a valve assembly incorporating a preferred embodiment of the present invention wherein the bypass mechanism is in the closed position; and FIG. 2 is a cross-sectional view similar to FIG. 1, in which the bypass mechanism is operative and thus in the open position.

DETAILED DESCRIPTION OF THE PREFERRED EMBODIMENT

Referring to FIG. 1, the preferred embodiment of the present invention is a thermostatically responsive reflief or bypass mechanism shown and generally designated 10, incorporated within a valve assembly generally designated 12. The valve assembly 12 includes a body or housing 14 that defines an internal passage 16. The passage 16 has an outlet portion 18 and an inlet portion 20. A neck or bend 22 in the passage 16 permits location of a cylindrical bore 24 for receipt of a valve member or stem 26.

Valve member 26 typically is threadably mounted within the bore 24. In the position shown in FIG. 1, the valve member 26 projects into the bend 22 to cooperate with a seat 33 to seal or close the passage 16. The valve member 26 may thus be rotated about an axis 35 of symmetry of member 26 to lift off of the seat 33 and open the passage 16. A tapered or frusto-conical face 30 is defined on the valve member 26 for cooperation with seat 33 to permit regulation of fluid flow through passage 16. That portion of the valve assembly 12 described so far is typical and is not a limitation of the invention.

The invention relates to the relief bypass mechanism 10. The bypass mechanism 10 includes a piston 32 positioned within a cylindrical counterbore 36 in the valve member 26. The counterbore 36 is coaxial with valve member 26 and extends inwardly from the outlet end of the valve member 26 to an inner end.

A probe member 34 extends coaxially with the valve member 26 and is affixed to the valve member 26 at the inner end 37. Probe member 34 is formed of a tubular metal rod and is fixed in counterbore 36 by means of a pin 38. That is, the pin 38 is driven into a crossbore 40 in the valve member 26, and projects through the inner end of hollow probe member 34 to secure the probe member 34 in position. Probe member 34 has a diameter which is less than the diameter or counterbore 36.

The piston 32 is annular and is slidably mounted on probe member 34 within the counterbore 36. Two opposed, elongated slots 44 are cut through the probe member 34. The slots 44 are parallel to the axis 35. A pin 46, driven into a crossbore 48 in the piston 32 passes through the slots 44. The piston 32 is thus secured to the probe member 34, and the extent of its sliding movement is limited by the length of the slots 44. A spring 54 is interposed between the end of counterbore 36 and the piston 32 so as to bias the piston 32 toward the outlet side of valve member 26 as limited by slots 44.

In assembly, the piston 32 is placed on the probe member 34, and the pin 46 is driven into the crossbore 48 and through the slots 44. The assembly of the piston 32, spring 54 and probe member 34 is then placed within the counterbore 36, and the probe member 34 pinned in position by pin 38.

One or more lateral, radial channels 50 are cut through the valve 26 from the counterbore 36. The channels 50 are in opposed relation to the piston 32 as shown and described in FIG. 1. The channels 50 and the counterbore 36 thus define a bypass channel within the valve member 26 when piston 32 is translated from the position shown in FIG. 1 to the position shown in FIG. 2. Fluid may thus flow through the passageway 16 from the inlet portion 20 to the outlet portion 18, bypassing the gap defined by the face 30 and seat 33.

The piston 32 may be axially translated between a first or closed position shown in FIG. 1 to a second or open position shown in FIG. 2. To equalize the fluid pressure in the counterbore 36 on both sides of the piston 32, an axially extending opening 58 is cut through the piston 32.

Translation of piston 32 is effected by a series of thermostatic actuators 60 contained with the probe member 34. The actuators 60 are positioned in series within a portion of the probe member 34 so as to act on the piston 32 in a sense opposite that imparted by spring 54. That is, a plug 62 is positioned in hollow probe member aganst the pin 46. The actuators 60 are then retained in the hollow probe member 34 between plug 62 and an end plug 64 attached at the outer end of probe member 34. A total of three actuators 60 are depicted in series in FIGS. 1 and 2.

The actuators 60 each contain, within a reservoir portion 66, a material which expands, or contracts, in response to external temperature change. The expansion, or contraction, causes extension, or retraction, of an actuator piston 68. The actuators 60 thus expand or countract in an axial direction in response to temperature change, and expansion or contraction of the separate actuators is summed by the arrangement described.

As shown in FIG. 1, the pistons 68 of the thermostatic actuators 60 are retracted. This condition exists when a normal temperature exists in the passage 16. As the temperature changes, e.g., when the temperature in the passage 16 rises, the temperature change is transmitted throught the probe 34 to the thermally expansive material within the actuators 60. As a result, the actuator pistons 68 extend, with the combined linear movement of the actuator pistons 68 being transmitted to the plug 62 and thereby to the piston 32. The piston 32 thus moves to the second or open position, as shown in FIG. 2, opening the channel 50, whereby an increased flow occurs between the inlet 20 and the outlet 18.

Upon change of the temperature within the passage 16 to an ambient state, the thermally expansive material within the actuators 60 contracts. The biasing force of the spring 54 then causes the piston 32 to move back to its first or closed position.

From the foregoing, it should be apparent to a person of ordinary skill in the art that a novel and highly useful thermostatically responsive valve bypass mechanism has been disclosed in this specification. A variety of changes and variations could be made in the valve bypass mechanism 10 of the preferred embodiment of the present invention. For example, the valve bypass mechanism 10 includes a series of actuators 60, such as are manufactured by Robertshaw Controls Company under the trademark Power Pill; however, other similar devices could be utilized. The preferred embodiment of the present invention is thus to be considered as illustrative and not restrictive. The scope of the present invention is to be measured by the appended claims and equivalents thereof.

What is claimed is:

1. In a valve assembly having a valve seat defining a fluid flow passage with an inlet and an outlet to the passage on opposite sides of the seat and a valve member cooperative with the valve seat to regulate fluid flow through the passage, the improvement of a temperature responsive valve member bypass mechanism comprising in combination:
   a bypass channel defining a piston chamber in the valve member, said channel connecting the inlet to the outlet and bypassing the valve seat;
   a piston slidably mounted in the piston chamber and translatable between closed position in which the bypass channel is closed and an open position in which the bypass channel is open;
   means for biasing the piston in a first direction to normally maintain the channel in the closed position;
   a heat transmissive probe projecting into the path of fluid flow through the valve assembly on the downstream side of the valve seat, said probe including thermostatically responsive, expansible means in contact with the piston and expandable in the opposite direction to the first direction whereby the thermostatically responsive, expansible means expand in response to a threshold temperature to translate the piston to the open position whereby fluid flows through the bypass channel.

2. A temperature responsive valve bypass mechanism of claim 1 wherein the thermostatically responsive, expansible means comprises a plurality of separate thermostatic actuators arranged in series.

3. The temperature responsive valve bypass mechanism of claim 1 wherein the valve member is translatable with respect to the valve seat along an axis to thereby regulate fluid flow and the piston chamber and piston are coaxial with said axis.

4. The temperature responsive valve bypass mechanism of claim 1 wherein the piston includes two active piston surfaces in communciation respectively with the biasing means and the thermostatically responsive means and said piston surfaces also being simultaneously in contact with fluid at the outlet of the passage.

5. The temperature responsive valve bypass mechanism of claim 1 wherein the probe is affixed to the valve member.

* * * * *